United States Patent [19]

East

[11] Patent Number: 5,277,149

[45] Date of Patent: Jan. 11, 1994

[54] PET DISH WITH MOAT

[76] Inventor: Michael J. East, Purser at Carl Ship, Rte. 2, Box 691, Liberty Hill, Tex. 78642

[21] Appl. No.: 974,461

[22] Filed: Nov. 12, 1992

[51] Int. Cl.⁵ .............................................. A01K 5/00
[52] U.S. Cl. ...................... 119/51.5; 119/61
[58] Field of Search ............... 119/51.5, 61; 248/128, 248/146, 151, 523, 524, 424, 429

[56] References Cited

U.S. PATENT DOCUMENTS

| | | | |
|---|---|---|---|
| 1,552,076 | 9/1925 | Mosier | 119/61 |
| 4,019,462 | 4/1977 | Palfalvy | 119/51.5 |
| 4,128,080 | 12/1978 | Haney | 119/61 |
| 4,399,772 | 8/1983 | Salinas | 119/51.5 |
| 4,896,627 | 1/1990 | Riddell | 119/61 |
| 4,953,506 | 9/1990 | Sanders | 119/61 |
| 4,966,099 | 10/1990 | Arney | 119/61 |
| 5,069,166 | 12/1991 | Ahuna | 119/61 |
| 5,069,167 | 12/1991 | Kasselman | 119/61 |
| 5,125,363 | 6/1992 | McGaha | 119/51.5 |

*Primary Examiner*—Gene Mancene
*Assistant Examiner*—Todd E. Manahan
*Attorney, Agent, or Firm*—Richard C. Litman

[57] ABSTRACT

This invention is an improved pet food dish which combines the food dish with the water dish, the food dish being supported by a frictional slip fit engagement between a pillar and socket. This slip engagement allows for the easy removal and storage of the upper dish. The socket does not extend beyond the bottom peripheral edge of the upper dish which permits the upper dish to remain at rest when stored on a flat supporting surface.

9 Claims, 4 Drawing Sheets

PET DISH WITH MOAT

BACKGROUND OF THE INVENTION

1. Field of the Invention

The present invention relates to animal feeding devices, and more particularly to a combination food and water dish wherein the food contained within the food dish is protected from crawling insects by a water barrier contained within the water dish.

2. Description of the Prior Art

Food dishes for pets and small animals often become infested with ants and other crawling insects. Various types of pet dishes are known in the prior art. A typical example of an insect inhibiting pet dish can be found in U.S. Pat. No. 4,128,080 issued on Dec. 5, 1978 to C. Haney. This patent discloses a combination food and water dish. The food dish is supported on a pillar above the water dish allowing the pet to both drink from the lower water dish and eat from the raised food dish. Unlike applicant's instant invention disclosed hereinafter, the Haney patent further discloses a non-moveable support pillar located in the center of the water dish. A water dish of this type accommodates only one food receptacle and does not allow the food receptacle to be selectively positioned. An alternative pet dish is shown in U.S. Pat. No. 4,896,627 issued Jan. 30, 1990 to D. Riddell. Riddell discloses a pet dish utilizing three receptacles stacked above one another and spaced apart in a concentric arrangement. The base receptacle acts as a reservoir for trapping and preventing crawling insects from accessing the two uppermost receptacles.

While the above mentioned devices are appropriate for their intended usage, none of the above inventions and patents, taken either singly or in combination, is seen to describe the instant invention as claimed.

SUMMARY OF THE INVENTION

The present invention is a pet food dish including a lower dish, an upper dish, and a pillar. The lower dish has a bottom surface having a first engaging member attachable to one end of the pillar. The first engaging member is located interiorly and along the bottom surface of the lower dish. The upper dish has a bottom surface and side walls extending below the bottom surface to provide a lower skirt. The upper dish has a second engaging member masked by the lower skirt and attachable to an opposite end of the pillar. The engaging members and the pillar may frictionally engage, such as through a cooperative interference fit. The pillar interconnects the lower dish to the upper dish supporting the upper dish above the lower dish. The first engaging member is a channel disposed along the bottom surface of the lower dish. The pillar is engagable with the channel and is slidable along the channel, enabling the upper dish to be supported in a desired location above the lower dish. Alternatively, the lower dish may be attached to the pillar via matingly engagable male and female members. Likewise, the upper dish may be connected to the pillar by cooperatively engaging male and female members. The lower dish is adapted to contain water and the upper dish is adapted to contain food. The food and water are provided for consumption by an animal. In addition, the water offers a barrier which prevents crawling insects from accessing the upper dish and the food contained therein. When the upper dish is detached from the pillar, it may be supported by a flat surface such as a counter top or a refrigerator shelf. The skirt enables the upper dish to remain in a stable disposition on the flat surface. The upper dish may be hermetically sealed by a removable lid.

Accordingly, it is a principal object of the invention to provide a pet food dish comprising a lower dish for containing water and an upper dish for containing food, the lower dish being connected to the upper dish by a pillar so as to support the upper dish above the lower dish thereby creating a barrier between the lower dish and the upper dish.

It is another object to provide an upper dish having a bottom surface and side walls extending below the bottom surface to provide a skirt. The skirt masks an engaging member which is attachable to the pillar and enables the upper dish to remain in a stable disposition when resting on a flat surface.

Another object of the present invention is to provide engaging members which frictionally and cooperatively engage the pillar with the upper and lower dishes.

Yet, another object is to provide a channel disposed along the bottom surface of the lower dish engagable with the pillar which enables the pillar to be supported in a number of locations along the channel, thereby allowing the upper dish to be selectively positioned over the lower dish.

Another object is to provide matingly engagable male and female members adapted to attach the pillar to both the upper and lower dishes.

Still, another object is to provide a removable lid for hermetically sealing the upper dish, thereby allowing for odor free storage of the upper dish.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
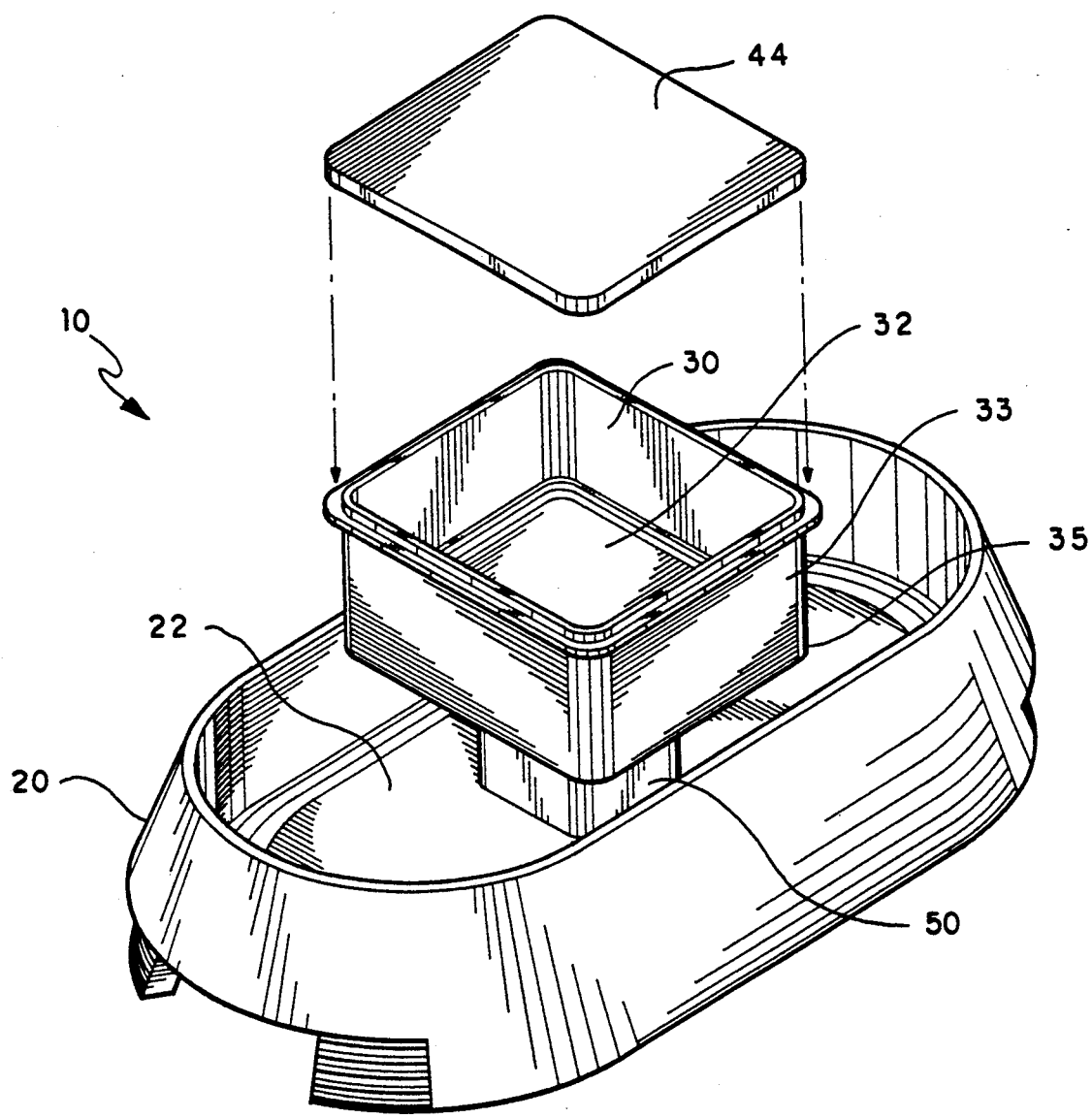
FIG. 1 is a perspective view of the pet food dish showing a lid detached therefrom.
Figure 2:
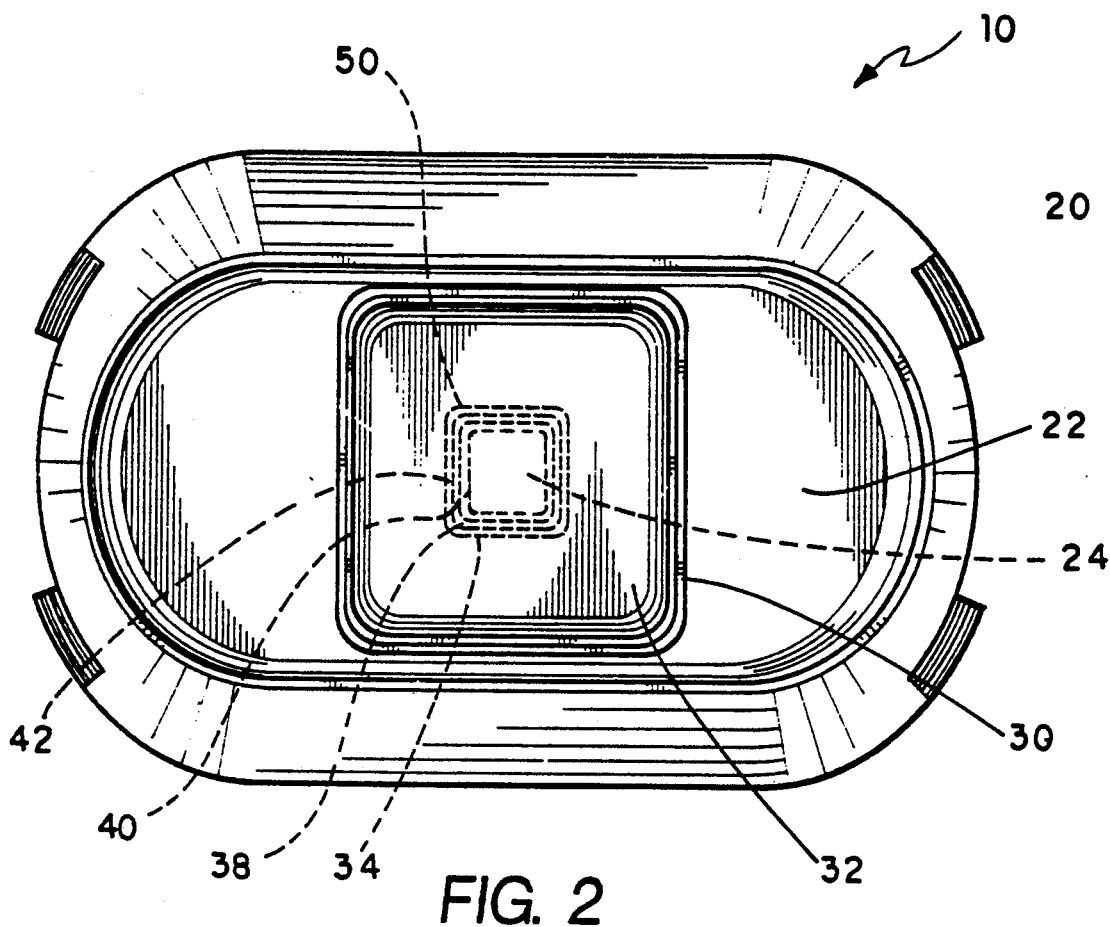
FIG. 2 is a top view of the pet food dish.

Now referring to the drawings and more Particularly, to FIGS. 1-4, there is shown a pet dish 10 according to the present invention. The pet food dish 10 includes a lower dish 20 for containing water, an upper dish 30 for containing pet food, a pillar 50 for connecting the upper dish 30 to the lower dish 20, and a removable lid 44 which allows the upper dish 30 to be sealed and stored without contaminating the surrounding environment.

The lower dish 20 has an interior bottom surface 22 and a member 24 protruding interiorly and upwardly therefrom. The upper dish 30 has a bottom surface 32 and side walls 33 extending below the bottom surface 32 to provide a lower skirt 35. A socket 34 projects downward from the bottom surface 32 and is masked by the skirt 35. The socket 34 does not extend beyond the bottom peripheral edge 36 of the upper dish 30. Thus, the upper dish 30 remains stable when supported on a flat supporting surface (not shown). The socket 34 is defined by an annular cavity 38 bounded by and between an inner peripheral wall 40 concentrically disposed within an outer peripheral wall 42. A pillar 50 has one end engagable with the member 24 protruding from the lower dish 20 and an opposite end engagable with the socket 34 projecting from the substantially planar recessed bottom surface 32 of the upper dish 30. The orientation of the upper dish 30 with respect to the lower dish 20 prevents crawling insects from accessing the upper dish 30 and contaminating the animal's food supply. The frictional slip fit engagement between the pillar 50, the inner peripheral wall 40 and the outer peripheral wall 42 is illustrated in FIG. 3.

Figure 3:
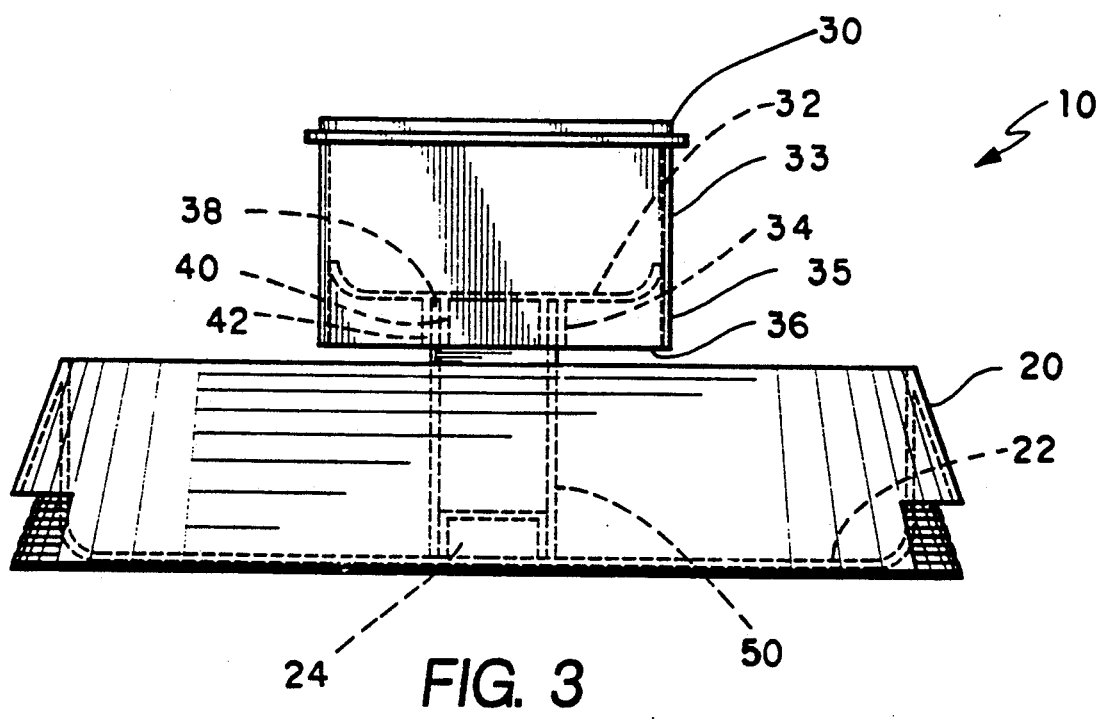
FIG. 3 is a front view of the pet food dish.

As is readily apparent from an inspection of FIG. 3, the peripheral walls 40, 42 making up socket 34, which depends from the bottom of the upper dish 30, are located entirely above a plane which is defined by the lower peripheral edge 36 of the dish skirt 35. Thus, The structure permits dish 30 to remain stable when placed on a supporting surface after dish 30 is removed from pillar 50.

Figure 4:
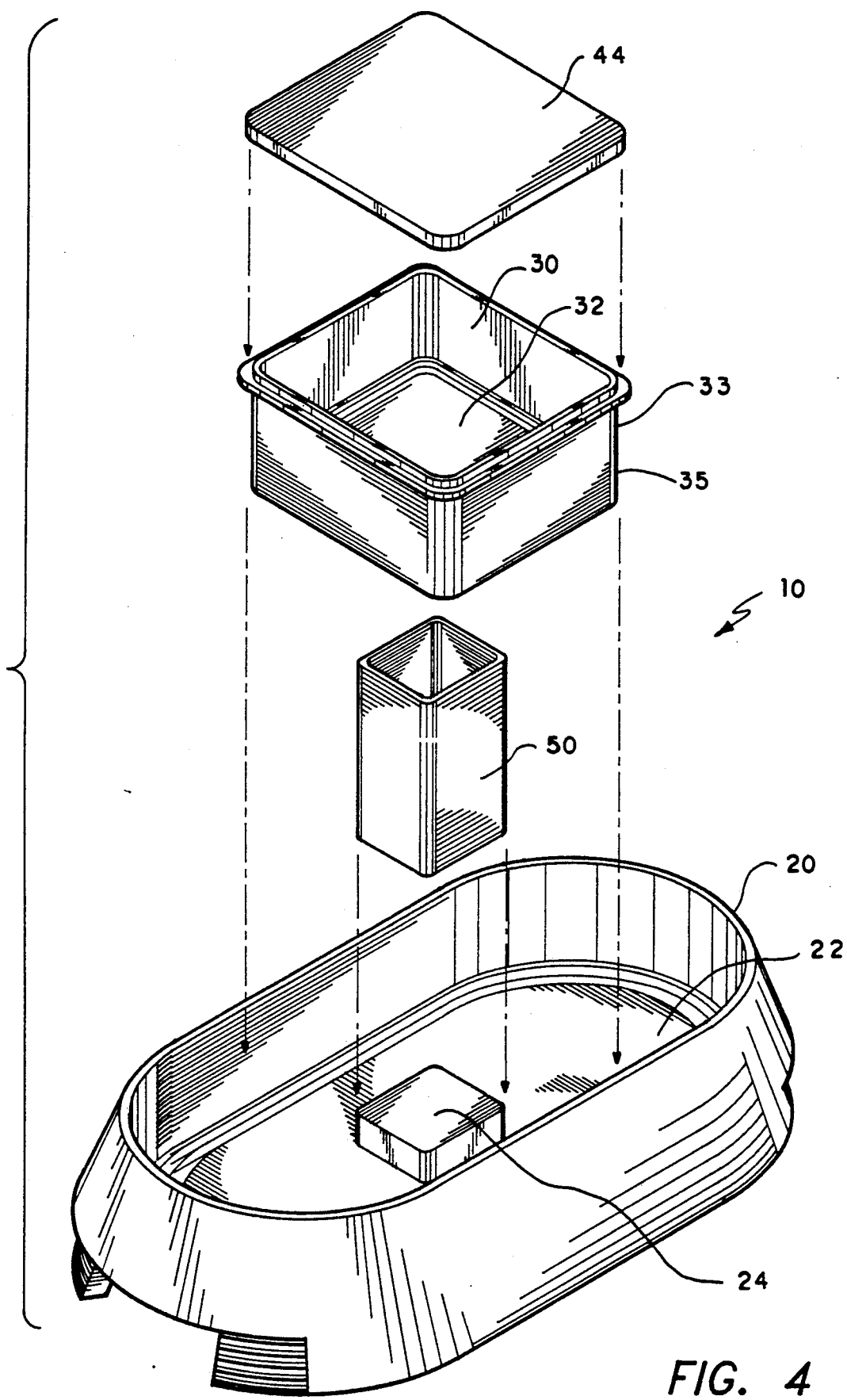
FIG. 4 is an exploded perspective view of the pet food dish.

Furthermore, and as can be appreciated from an inspection of FIGS. 1, 3, and 4, pillar 50 is of uniform, monolithic construction throughout, such that the opposed ends of the pillar 50 are identical. Thus, a pillar end is attachable to either socket 34 of upper dish 30 or to member 24 in the lower dish 20. Accordingly, when the dishes and pillar are assembled, it does not matter which end of pillar 50 is attached to which dish. Obviously, this makes assembly of the three components virtually foolproof.

Also, it is seen from these same figures that the pillar 50 is rectangular in cross section throughout its entire length, so that when the upper dish, lower dish and pillar are in assembly, inadvertent rotation of the upper dish in relation to the lower dish is prevented.

Figure 5:
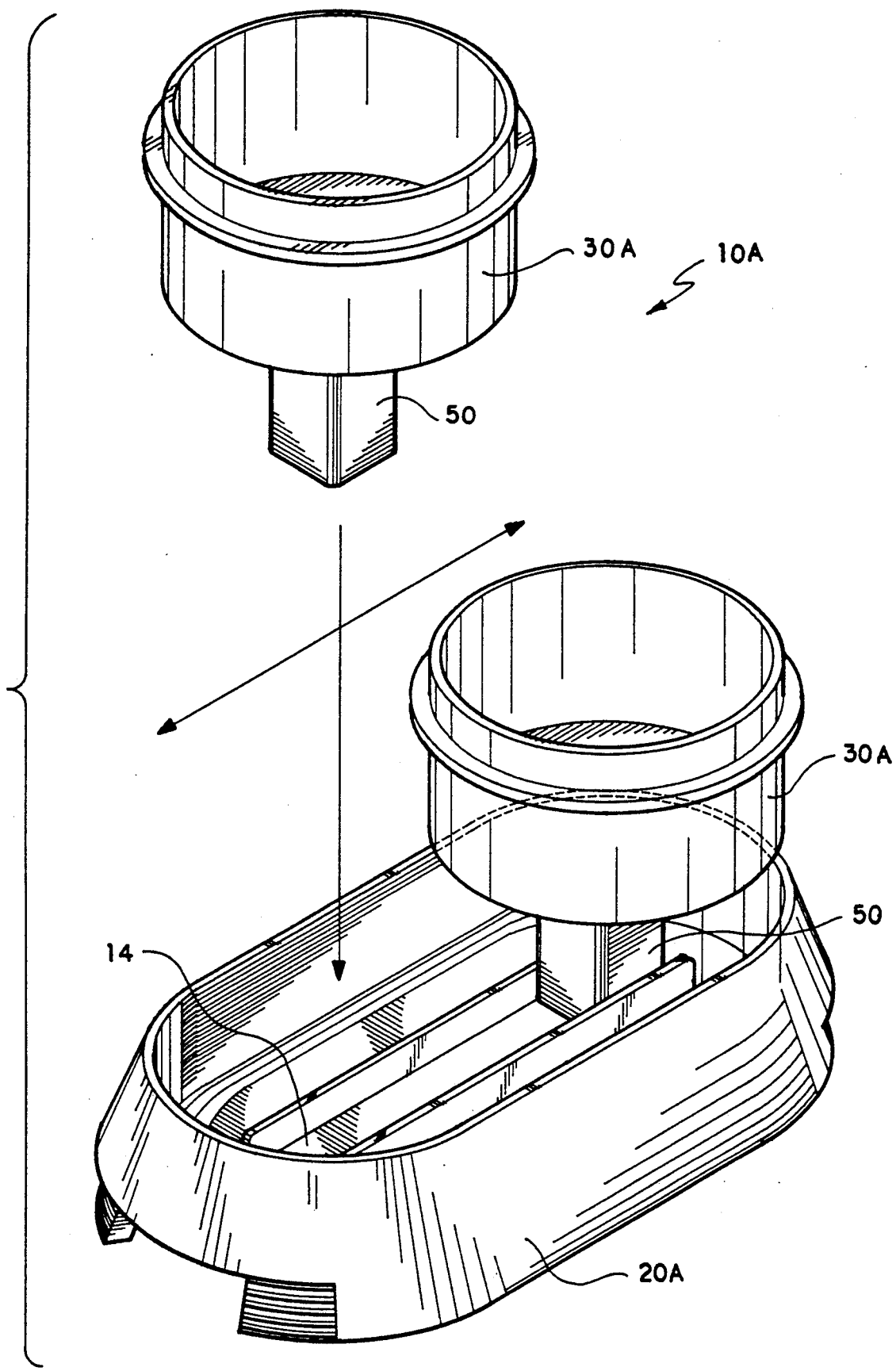
FIG. 5 is a perspective view of an alternative pet food dish.

FIG. 5 illustrates an alternative pet food dish 10A, similarly constructed with respect to the pet food dish described above. However, the lower dish 20A of this alternative embodiment 10A includes a channel 14 disposed in the interior bottom surface of dish 20A, along a longitudinal axis or centerline thereof. The pillar 50 is slidable and frictionally engagable with the channel 14, thereby enabling the upper dish 30A to be selectively positioned in a desired location anywhere along the longitudinal axis. The channel 14 configuration in the lower dish 20A provides for multiple pillars 50 to be positioned therein. This enables multiple upper dishes 30A to be engaged with the lower dish 20A.

With respect to the above description, it is to be realized that various lengths of the pillar 50 can be used and that more than one upper dish 30 can be attached to the lower dish 20A by means of more than one pillar 50.

It is to be understood that the present invention is not limited to the embodiments described above, but encompasses any and all embodiments within the scope of the following claims.

I claim:
1. A pet dish including:
    a lower dish having a bottom surface;
    an upper dish having a bottom surface and side walls extending below said bottom surface to provide a lower skirt; and
    a pillar having first and second ends;
    said lower dish having a first engaging means attachable to said first end of said pillar, said first engaging means located interiorly and along said bottom surface of said lower dish;
    said upper dish having a second engaging means attachable to said second end of said pillar, said second engaging means being located interiorly of said upper dish and depending from said bottom surface of said upper dish, and being located entirely above a plane defined by the lower peripheral edge of said upper dish lower skirt;
    said pillar being of uniform, monolithic construction throughout, said first and second ends of said pillar being identically configured so as to be attachable to either of said lower dish first engaging means and said upper dish second engaging means;
    said pillar interconnecting said lower dish to said upper dish, thereby supporting said upper dish above said lower dish, whereby said lower dish facilitates the containment of water and said upper dish facilitates the containment of food, the food and water each being for consumption by a pet and the water further providing a barrier to prevent crawling insects from accessing said upper dish and the food contained therein, and when said upper dish is removed from pillar and is supported by a flat surface, said skirt enables said upper dish to remain in a stable disposition.

2. The pet dish according to claim 1, wherein said pillar is rectangular in cross section along its entire length, whereby inadvertent rotation of the upper dish in relation to the lower dish is prevented when said upper dish, said lower dish and said pillar are in assembly.

3. The pet dish according to claim 1, including a frictional engaging means, said frictional engaging means providing an interference fit between both said first engaging means and said pillar and said second engaging means and said pillar.

4. The pet dish according to claim 1, wherein said first engaging means includes a male member and said first end of said pillar includes a female member, said male member being engagable with said female member.

5. The pet dish according to claim 1, wherein said first engaging means includes a female member and said first end of said pillar includes a male member, said female member being engagable with said male member.

6. The pet dish according to claim 1, wherein said second engaging means includes a male member and said second end of said pillar includes a female member, said male member being engagable with said female member.

7. The pet dish according to claim 1, further including a removable lid, said upper dish being hermetically sealable by said removable lid, whereby said dish may be stored in a horizontal position on a horizontal surface in an upright, stable attitude when not supported by said pillar.

8. A pet dish including:
    a lower dish having a bottom surface;

an upper dish having a bottom surface and side walls extending below said bottom surface to provide a lower skirt; and a pillar having first and second ends;

said lower dish having a first engaging means attachable to said first end of said pillar, said first engaging means located interiorly and along said bottom surface of said lower dish;

said first engaging means including a channel, said channel being disposed along said bottom surface of said lower dish, whereby said first end of said pillar is engagable with said channel and is slidable along said channel so as to permit said upper dish to be selectively supported in a desired location above said lower dish;

said pillar interconnecting said lower dish to said upper dish and supporting said upper dish above said lower dish, whereby said lower dish facilitates the containment of water and said upper dish facilitates the containment of food, the food and water each being for consumption by a pet and the water further providing a barrier to prevent crawling insects from accessing said upper dish and the food contained therein, and when said upper dish is removed from pillar and is supported by a flat surface, said skirt enable said upper dish to remain in a stable, upright disposition.

9. The pet dish according to claim 8, further including a removable lid, said upper dish being hermetically sealable by said removable lid, whereby said dish may be stored in a horizontal position on a horizontal surface in an upright, stable attitude when not supported by said pillar.

* * * * *